US011978587B2

(12) United States Patent
Slade

(10) Patent No.: US 11,978,587 B2

(45) **Date of Patent: *May 7, 2024**

(54) WOUND HTS MAGNET COILS

(71) Applicant: Tokamak Energy Ltd, Abingdon (GB)

(72) Inventor: Robert Slade, Abingdon (GB)

(73) Assignee: Tokamak Energy Ltd., Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,181

(22) Filed: Mar. 22, 2022

(65) Prior Publication Data

US 2022/0215994 A1 Jul. 7, 2022

Related U.S. Application Data

(63) Continuation of application No. 16/965,801, filed as application No. PCT/GB2019/050245 on Jan. 30, 2019, now Pat. No. 11,289,253.

(30) Foreign Application Priority Data

Jan. 31, 2018 (GB) ...................................... 1801603
Oct. 22, 2018 (GB) ...................................... 1817159

(51) Int. Cl.
*H01F 6/06* (2006.01)
*H01F 41/04* (2006.01)

(52) U.S. Cl.
CPC ............. *H01F 6/06* (2013.01); *H01F 41/048* (2013.01)

(58) Field of Classification Search
CPC . H01F 41/048; H01F 6/00; H01F 6/02; H01F 6/06; H01F 6/065; H01F 2006/001; Y02E 30/10; G21B 1/057; G21B 1/00
USPC .......................................................... 335/216
See application file for complete search history.

(56) References Cited

U.S. PATENT DOCUMENTS 4,151,498 A 4/1979 Katsurai
2012/0065074 A1 3/2012 Xie et al.
2014/0211900 A1 7/2014 Kingham et al.
2016/0232988 A1 * 8/2016 Sykes ...................... G21B 1/05
(Continued)

FOREIGN PATENT DOCUMENTS

GB 2418069 A 3/2006
JP 2016163026 A 9/2016
(Continued)

OTHER PUBLICATIONS

Search Report issued by the United Kingdom Intellectual Property Office for Application No. 1801603.0 dated Jul. 18, 2018 (4 pages).
(Continued)

*Primary Examiner* — Mohamad A Musleh
*Assistant Examiner* — Lisa N Homza
(74) *Attorney, Agent, or Firm* — Michael Best & Friedrich LLP

(57) ABSTRACT

A method of manufacturing an HTS coil is provided. The method comprises winding an ITS coil cable to produce a coil having a plurality of turns. During winding of a turn of the coil, one or more HTS shunt cables are placed adjacent to the previous turn of the coil along a first arc of the coil, and then the turn is wound such that the HTS shunt cable is sandwiched between the turn and the previous turn of the coil such that current can be shared between the HTS shunt cable and the HTS coil cable.

11 Claims, 5 Drawing Sheets

(56) References Cited

U.S. PATENT DOCUMENTS

| | | | | |
|---|---|---|---|---|
| 2020/0194154 | A1* | 6/2020 | Markiewicz | H01F 6/02 |
| 2020/0335230 | A1* | 10/2020 | Brittles | H01F 6/06 |
| 2020/0381154 | A1* | 12/2020 | Slade | H01F 6/06 |

FOREIGN PATENT DOCUMENTS

| | | | |
|---|---|---|---|
| WO | 2017042543 | A1 | 3/2017 |
| WO | 2018078326 | A1 | 5/2018 |

OTHER PUBLICATIONS

Search Report issued by the United Kingdom Intellectual Property Office for Application No. 1817159.5 dated Apr. 24, 2019 (3 pages).

International Search Report and Written Opinion for Application No. PCT/GB/2019/050245, dated Mar. 28, 2019 (13 pages).

International Preliminary Report on Patentability for Application No. PCT/GB2019/050245 dated Jan. 9, 2020 (14 pages).

Bromberg et al., "Current distribution and re-distribution in HTS cables made from 2nd generation tapes," AIP Conference Proceedings, 2012, vol. 1434, pp. 1001-1008.

* cited by examiner

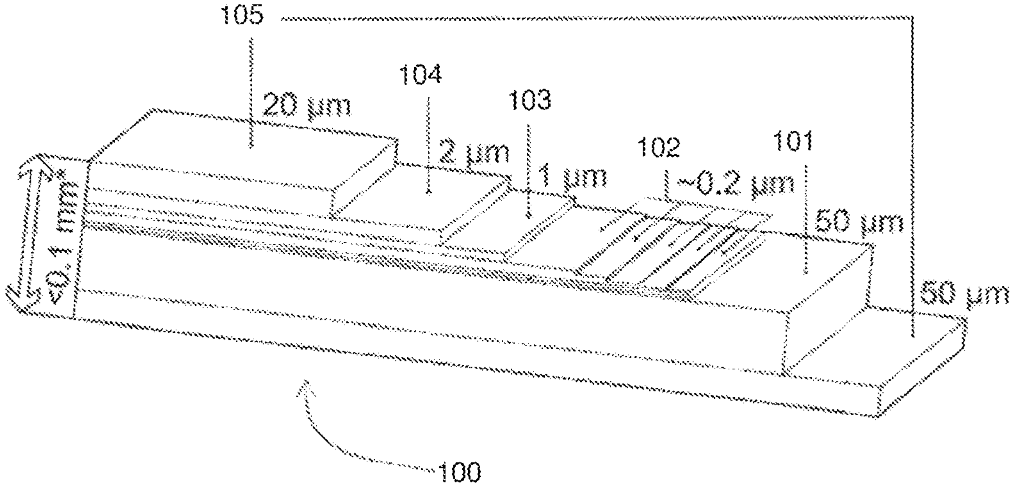
Figure 1 - Prior Art
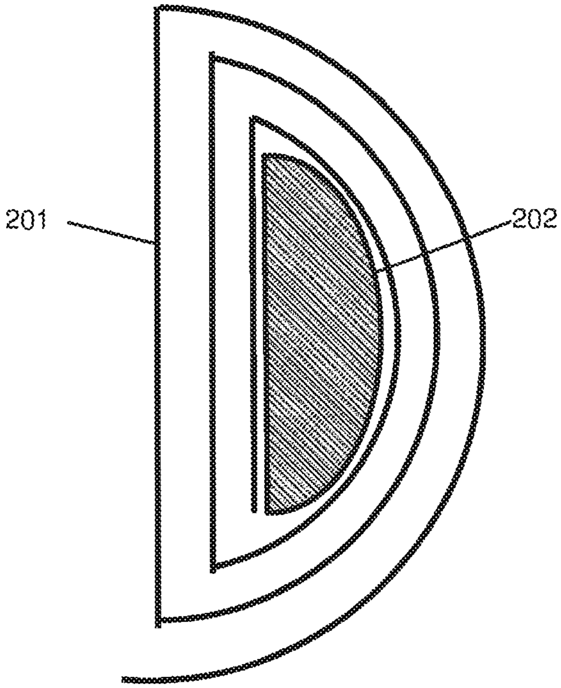
Figure 2 - Prior Art

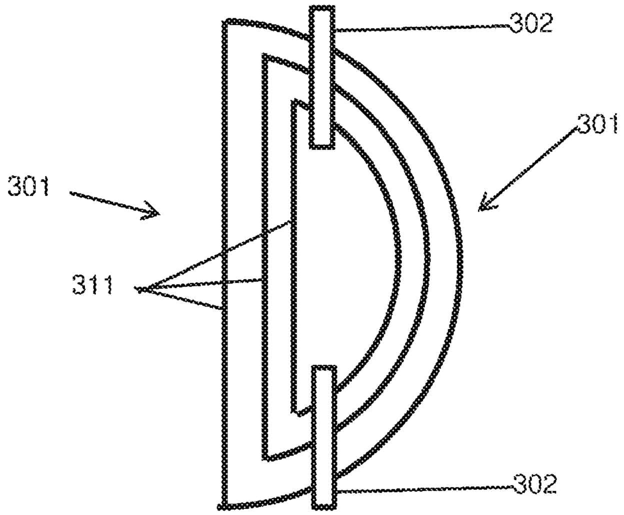
Figure 3 - Prior Art
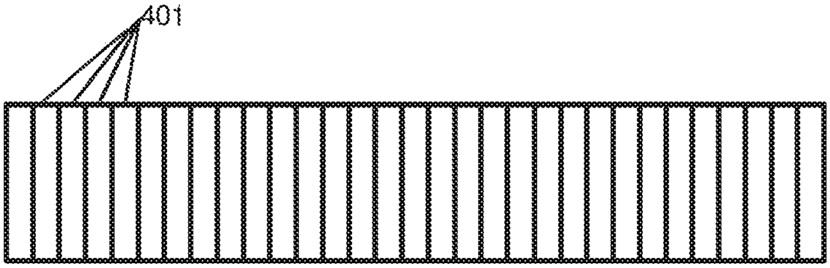
Figure 4 - Prior Art
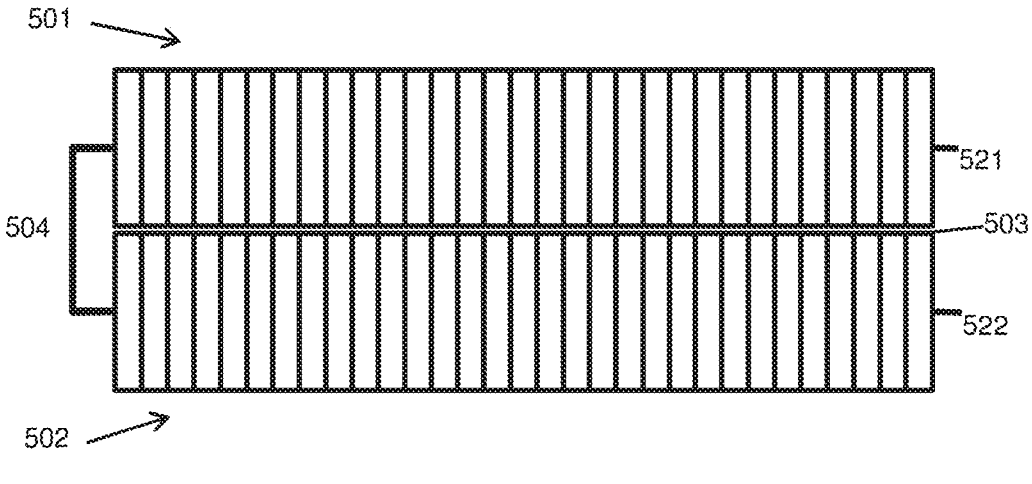
Figure 5 - Prior Art

[MRC1]

WOUND HTS MAGNET COILS

CROSS REFERENCE TO RELATED APPLICATIONS

This application is a continuation of U.S. patent application Ser. No. 16/965,801, filed Jul. 29, 2020, which is a national phase filing under 35 U.S.C. § 371 of International Application No. PCT/GB2019/050245 filed on Jan. 30, 2019, which claims priority to Great Britain Patent Application No. 1801603.0 filed on Jan. 31, 2018, and Great Britain Patent Application No. 1817159.5 filed on Oct. 22, 2018, the entire contents of which are incorporated by reference herein.

FIELD OF THE INVENTION

The present invention relates to high temperature superconductor magnets.

BACKGROUND

The challenge of producing fusion power is hugely complex. Many alternative devices apart from tokamaks have been proposed, though none have yet produced any results comparable with the best tokamaks currently operating such as JET.

World fusion research has entered a new phase after the beginning of the construction of ITER, the largest and most expensive (c15bn Euros) tokamak ever built. The successful route to a commercial fusion reactor demands long pulse, stable operation combined with the high efficiency required to make electricity production economic. These three conditions are especially difficult to achieve simultaneously, and the planned programme will require many years of experimental research on ITER and other fusion facilities, as well as theoretical and technological research. It is widely anticipated that a commercial fusion reactor developed through this route will not be built before 2050.

To obtain the fusion reactions required for economic power generation (i.e. much more power out than power in), the conventional tokamak has to be huge (as exemplified by ITER) so that the energy confinement time (which is roughly proportional to plasma volume) can be large enough so that the plasma can be hot enough for thermal fusion to occur.

WO 2013/030554 describes an alternative approach, involving the use of a compact spherical tokamak for use as a neutron source or energy source. The low aspect ratio plasma shape in a spherical tokamak improves the particle confinement time and allows net power generation in a much smaller machine. However, a small diameter central column is a necessity, which presents challenges for design of the plasma confinement magnet.

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a critical temperature (the temperature above which the material cannot be superconducting even in zero magnetic field) below about 30K. The behaviour of HTS material is not described by BCS theory, and such materials may have critical temperatures above about 30K (though it should be noted that it is the physical differences in superconducting operation and composition, rather than the critical temperature, which define HTS and LTS material). The most commonly used HTS are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diborate (MgB.sub.2).

ReBCO is typically manufactured as tapes, with a structure as shown in FIG. 1. Such tape 100 is generally approximately 100 microns thick, and includes a substrate 101 (typically electropolished hastelloy approximately 50 microns thick), on which is deposited by IBAD, magnetron sputtering, or another suitable technique a series of buffer layers known as the buffer stack 102, of approximate thickness 0.2 microns. An epitaxial ReBCO-HTS layer 103 (deposited by MOCVD or another suitable technique) overlays the buffer stack, and is typically 1 micron thick. A 1-2 micron silver layer 104 is deposited on the HTS layer by sputtering or another suitable technique, and a copper stabilizer layer 105 is deposited on the tape by electroplating or another suitable technique, which often completely encapsulates the tape.

The substrate 101 provides a mechanical backbone that can be fed through the manufacturing line and permit growth of subsequent layers. The buffer stack 102 is required to provide a biaxially textured crystalline template upon which to grow the HTS layer, and prevents chemical diffusion of elements from the substrate to the HTS which damage its superconducting properties. The silver layer 104 is required to provide a low resistance interface from the ReBCO to the stabiliser layer, and the stabiliser layer 105 provides an alternative current path in the event that any part of the ReBCO ceases superconducting (enters the "normal" state).

In addition, "exfoliated" HTS tape can be manufactured, which lacks a substrate and buffer stack, and instead has silver layers on both sides of the HTS layer. Tape which has a substrate will be referred to as "substrated" HTS tape.

In addition, "exfoliated" HTS tape can be manufactured, which lacks a substrate and buffer stack, and instead has silver layers on both sides of the HTS layer. Tape which has a substrate will be referred to as "substrated" HTS tape.

When describing coils in this document, the following terms will be used:

- "HTS cable"—a cable comprising one or more HTS tapes. In this definition, a single HTS tape is an HTS cable.
- "turn"—a section of ITS cable within a coil which encloses the inside of the coil (i.e. which can be modelled as a complete loop)
- "arc"—a continuous length of the coil turn which is less than the whole coil turn
- "inner/outer radius"—the distance from the centre of the coil to the inside/outside of the HTS cables
- "inner/outer perimeter"—the distance measured around the inside/outside of the coil
- "thickness"—the radial width of all of the turns of the coil, i.e. the difference between the inner and outer radius
- "critical current"—the current at which the HTS would become normal, at a given temperature and external magnetic field (where HTS is considered to have "become normal" at a characteristic point of the superconducting transition, where the tape generates E.sub.0 volts per metre. The choice of E.sub.0 is arbitrary, but is usually taken to be 10 or 100 microvolts per metre.)
- "critical temperature"—the temperature at which the HTS would become normal, at a given the magnetic field and current "peak critical temperature"—the temperature at which the HTS would become normal given no external magnetic field, and negligible current.

Two types of constructing for magnet coils from HTS tapes are considered—by winding a cable made of several tapes, or by assembling several sections of pre-formed HTS busbars. Wound coils, as shown in FIG. 2, are manufactured by wrapping an HTS cable 201 around a former 202 in a continuous spiral. The former is shaped to provide the required inner perimeter of the coil, and may be a structural part of the final wound coil, or may be removed after winding. Sectional coils, as shown schematically in FIG. 3, are composed of several sections 301, each of which may contain several cables or preformed busbars 311 and will form an arc section of the overall coil. The sections are connected by joints 302 to form the complete coil. While the turns of the coils in FIGS. 2 and 3 are shown spaced apart for clarity, there will generally be material connecting the turns of the coil. The coils may be "insulated"—having electrically insulating material between the turns of the coil, "non insulated", where the turns of the coil are electrically connected radially, as well as along the cables (e.g. by connecting the copper stabiliser layers of the cables by soldering or by direct contact), or partially insulated, where the turns are connected by resistive material. Non-insulated coils are generally not suitable for large coils, for reasons which will be discussed in more detail later.

FIG. 4 shows a cross section of a specific type of wound coil known as a "pancake coil", where HTS cables 401 are wrapped to form a flat coil, in a similar manner to a spool of ribbon. Pancake coils may be made with an inner perimeter which is any 2 dimensional shape. Often, pancake coils are provided as a "double pancake coil", as shown in the cross section of FIG. 5, which comprises two pancake coils 501, 502 wound in opposite sense, with insulation 503 between the pancake coils, and with the inner terminals connected together 504. This means that voltage only needs to be supplied to the outer terminals 521, 522, which are generally more accessible, to drive current through the turns of the coil and generate a magnetic field.

Wound coils may be significantly easier to manufacture than coils assembled from jointed busbars, however there are some limitations. For example, in magnets with highly asymmetric field distributions around the coil, it is advantageous to "grade" the cables (or busbars) in the magnet, providing more HTS in regions of high field (and hence low critical current per tape) and less HTS in regions of low field (and hence high critical current per tape). Similarly the amount of HTS may be adjusted to compensate for the effect of the magnetic field direction relative to the ab-plane of the ReBCO crystal, with more HTS (in the form of additional tapes) being provided as the field angle moves out of the ReBCO ab-plane. This is clearly not possible in a coil continuously wound from a single, uniform cable, as the amount of HTS in any given cross section through the coil will be the same around the whole coil (to within a single cable cross section).

Sectional coils can be easily made with graded cables/busbars—simply by providing different amounts of HTS in each section or at different points in each section. However, the joints required for sectional coils present a significant electrical and mechanical engineering challenge, as their resistance must be minimised, they will often be subject to large mechanical loads, and they may require precise alignment. In addition, a sectional coil will always have more resistance than an equivalent wound coil, due to the joints, since all the current has to pass from the HTS in one cable/busbar, through a short distance of resistive material (such as copper) at the joint, and then back into HTS in the second cable/busbar; It is known that the resistance of the ReBCO-Ag interface inside individual HTS tapes represents the limiting factor in the design of HTS cable/busbar joints.

SUMMARY

According to a first aspect of the invention, there is provided a method of manufacturing a high temperature superconducting, HTS, coil, the method comprising:

- winding an HTS coil cable to produce a coil having a plurality of turns;
- during winding of a turn of the coil, placing one or more HTS shunt cables adjacent to the previous turn of the coil along a first arc of the coil, and then winding the turn such that the HTS shunt cable is sandwiched between the turn and the previous turn of the coil such that current can be shared between the HTS shunt cable and the HTS coil cable.

According to a second aspect of the invention, there is provided a method of manufacturing a high temperature superconducting, HTS, coil, the method comprising:

- interleaving one or more HTS shunt cables between HTS tapes of an HTS coil cable, such that, when the or each HTS coil cable is wound to produce a coil, the or each HTS shunt cable lies along a first arc of the coil; and
- winding the HTS coil cable around the former to produce a coil having a plurality of turns.

According to a third aspect of the invention, there is provided a high temperature superconducting, HTS, coil comprising:

- an HTS coil cable arranged to form a spiral having a plurality of turns;
- one or more HTS shunt cables, each arranged between a respective pair of adjacent turns, along a first arc of the coil, such that current can be shared between the HTS coil cable and at least one side of the HTS shunt cable According to a fourth aspect of the invention, there is provided a high temperature superconductor, HTS, coil comprising an HTS coil cable arranged to form a spiral having a plurality of turns, wherein the HTS coil cable comprises at least one HTS shunt cable arranged between HTS tapes of the HTS coil cable along an arc of the HTS coil cable such that current can be shared between the HTS shunt cable and the HTS coil cable.

Further embodiments are presented in claim 2 et seq.

BRIEF DESCRIPTION OF THE DRAWINGS

FIG. 1 is a schematic illustration of an HTS tape;

FIG. 2 is a schematic illustration of a wound HTS coil;

FIG. 3 is a schematic illustration of a sectional HTS coil;

FIG. 4 is a schematic illustration of a cross section of a pancake coil;

FIG. 5 is a schematic illustration of a cross section of a double pancake coil;

DETAILED DESCRIPTION

A coil construction will now be described which allows the use of grading (i.e. variable amounts of HTS in different parts of the coil) for a wound coil, particularly a pancake coil. Such a construction is of particular use for coils which would have a significantly asymmetric magnetic field when in use, be subject to a significantly asymmetric external field and/or be subject to a significant temperature gradient. For example, such a construction is particularly useful in the toroidal field (TF) coil of a tokamak, where the parts of the toroidal field coil which pass through the central column experience considerably higher magnetic field than the return limbs, and hence require considerably more HTS to carry the same transport current than the parts in the outer sections of the return limbs. The angle between the magnetic field and the ab-plane of the ReBCO must also be considered when choosing the number of HTS tapes required to carry the transport current, so the TF magnet design is complex.

Grading is desirable for two reasons: (a) to minimise the amount of (expensive) HTS needed, and (b) to keep all parts of the coil at a similar fraction of critical current. The second reason is important because it ensures that the temperature margin of the coil is similar at all positions, facilitating a more uniform quench when the magnet has to be rapidly shut down by heating the coils.

Figure 6:
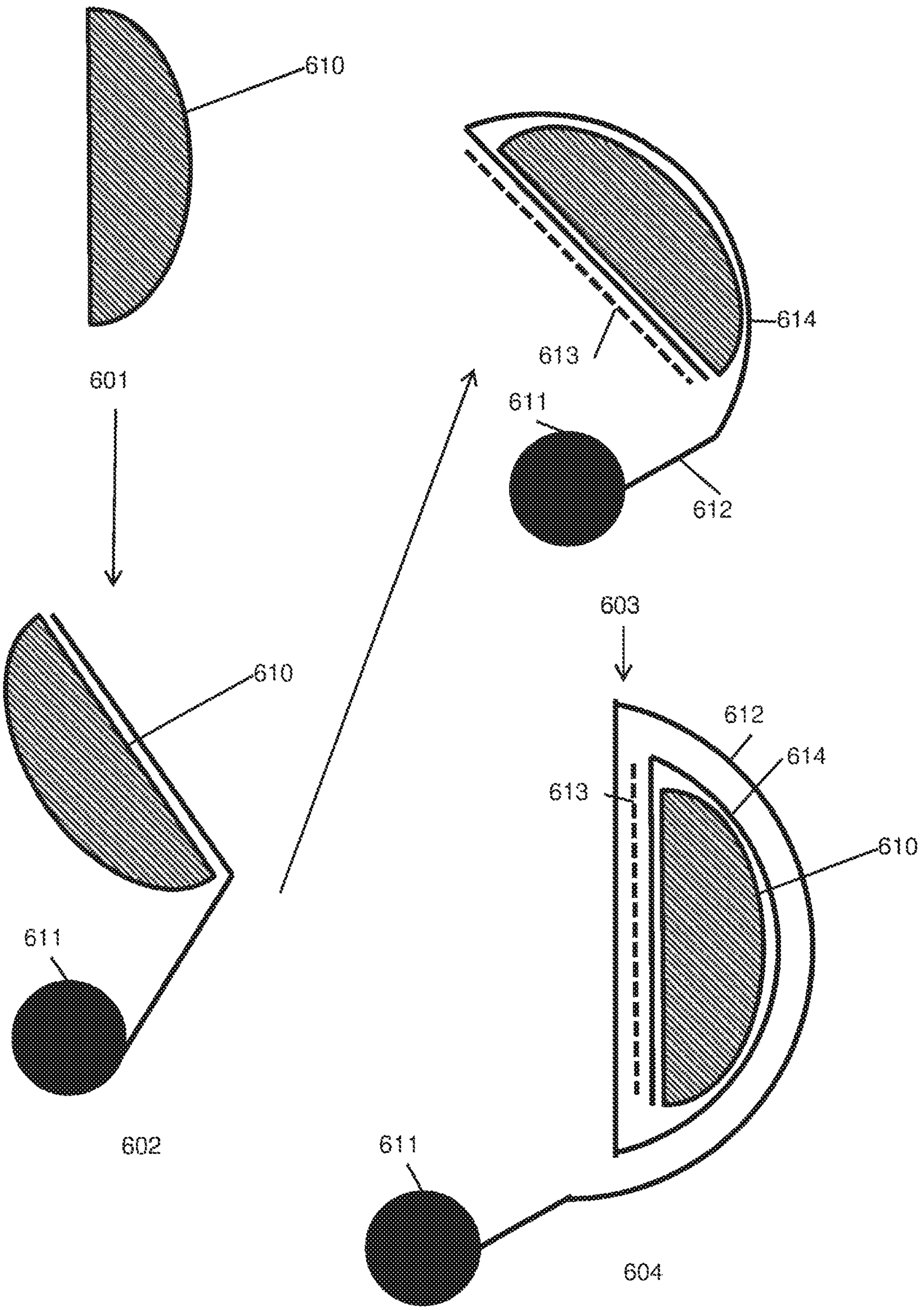
FIG. 6 is a schematic illustration of a method of winding a HTS coil.

The manufacture of such a coil is similar to that of a conventional wound HTS coil. FIG. 6 illustrates schematically the steps of manufacturing the coil. In step 601, a former 610 is provided to define the inner perimeter of the coil. In step 602, a spool of HTS cable 611 is unwound as the former rotates such that the cable winds around the former. In step 603, during winding of a turn 612, an additional length of HTS cable, which will hereafter be referred to as an HTS shunt 613, is placed adjacent to the previous turn 614 of the HTS coil cable along an arc of the coil, so that once the turn 612 is wound (step 604), the HTS shunt 613 ends up sandwiched between the turn 612 and the previous turn 613. Electrically insulating material may be provided on one side of the shunt 613, to isolate the turns 612 and 614 from each other, but the shunt is in electrical contact to one or both of the turns 612 and 614 along its length, to allow current sharing between the shunt and the HTS coil cable. This may be repeated for multiple turns of the coil, or for all turns of the coil (with optionally either an additional shunt inside the inner turn, or an additional shunt outside the outer turn). The shunts are placed along an arc of the coil where more HTS is required.

Additional components, such as sensors, coolant channels, or heaters for inducing quenches may be wound into the coil in other arcs, in a similar manner to the shunts, except that such additional components may or may not require electrical contact to the main HTS coil.

Figure 7:
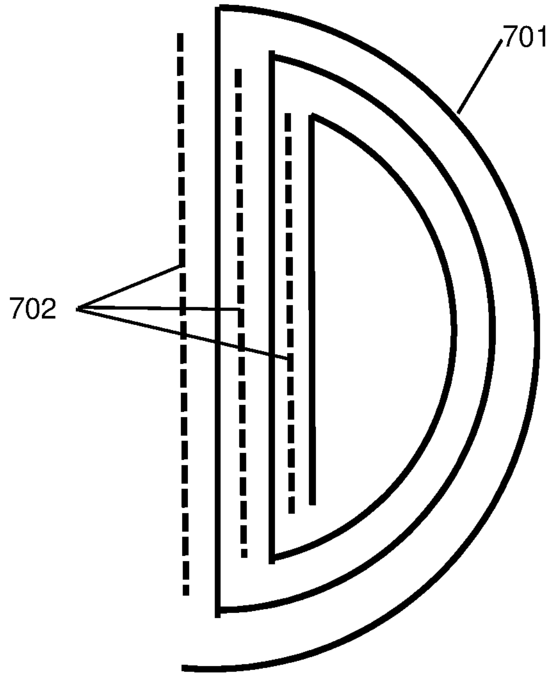
FIG. 7 is a schematic illustration of an HTS coil resulting from the method of FIG. 6.

FIG. 7 is a schematic illustration of the final HTS coil. While FIG. 7 shows a coil 701 with only three turns and three shunts 702, it will be appreciated that greater numbers of turns and shunts may be provided. Each of the shunts is placed along an arc 703 of the coil, and provides a greater cross section of HTS in that arc, while still being relatively simple to manufacture compared to a sectional coil. The shunts are shown in the central column section of a TF coil, but may be placed in any location within the coil (as design considerations require). For example, shunts may be placed in the return limbs of a TF coil, as the field angle in the return limbs may be less favourable than in the central column.

The HTS shunts may be made from a cable with the same structure (i.e. number and arrangement of tapes) as that of the main HTS coil, or they may be made from a cable with a different structure. HTS shunts between different turns may have different structures or be made from HTS manufactured by different methods, with varying performance and dimensions.

There will be some resistance between the main HTS coil and the HTS shunts, but this will be very low as current can transfer to or from the shunts along their whole length. This is also true if the coil is provided without insulation, such that current can enter the shunts from either side—though the resistance on the substrate side of the HTS shunt would be higher than that on the HTS side. As such, when the current in the coil is such that if the critical current of the main HTS coil alone is not sufficient in the arc with the shunts to carry the transport current, then excess current will be easily shared to the HTS shunts. At currents less than the critical current of the main HTS coil in the graded region, the vast majority of the current will primarily flow in the wound HTS coil. As the wound coil current approaches the critical current of the parts of the coil experiencing higher magnetic field (or higher temperature, or magnetic field angle less well aligned with the c-axis of the ReBCO HTS layer), the HTS will generate a voltage which will drive excess current through the small resistance between the main coil and the shunt. The voltage generated per metre of HTS (E.sub.HTS) is given by $$E H T S = E 0 ( I I c ) n \#\#EQU00001\#\#$$

where E.sub.0=1.mu.V/cm is the defined critical current criterion, I.sub.c is the critical current of the tape at this criterion, and n is an experimental parameter that models the sharpness of the superconducting to normal transition; n is typically in the range 20-50 for ReBCO. Depending on the value of n, the voltage is negligible for values of .alpha.=I/I.sub.c less than about 0.8. The excess current above the local critical current will be shared into the shunt. This will happen with minimal dissipation, and the small amount of heat generated will be accommodated by the design of the coil cooling system. The number of shunts, and the number of tapes in each shunt, can be chosen based on the amount of HTS needed to keep the ratio .alpha. approximately the same in all parts of the coil. The cable used for the main HTS coil and the cable used for the HTS shunts may have the same structure (e.g. number and arrangement of tapes), or may have different structures.

Where shunts are provided along an arc of the coil, they may be provided evenly to all tapes of the coil tape (e.g. each turn of the coil tape may have an HTS shunt comprising two tapes), or the distribution of the shunts may vary across the coil cross section (e.g. providing shunts to every turn towards the outside of the central column for a TF coil, and providing shunts only to every other turn and/or shunts with fewer HTS tapes for turns towards the inside of the central column of a TF coil, as the magnetic field is lower).

Figure 8:
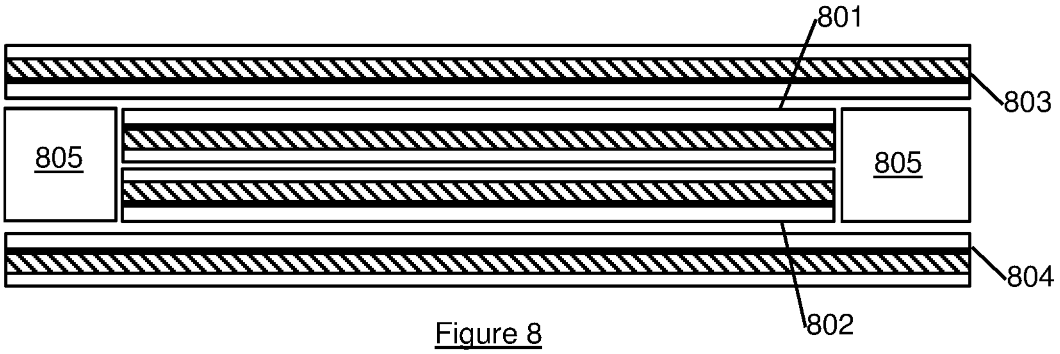
FIG. 8 is a schematic illustration of an HTS cable having an interleaved HTS shunt.

FIG. 8 illustrates an alternative construction to that described above. In FIG. 8, the additional HTS tapes 801, 802 in the shunts may be added between the tapes 803, 804 in the HTS cable—i.e. the shunts may be interleaved into the HTS cable in locations which will result in a graded coil when the HTS cable is wound. If substrated tapes are used, then ideally this is done such that the HTS (e.g. ReBCO) sides of the tapes in the cable face the HTS sides of the tapes in the shunts—either on one side or, as shown in FIG. 8, on both sides where the HTS shunt is provided as a type-2 pair. In parts of the coil where the shunt tapes are not needed, they can be substituted by metal spacing elements 805. This avoids steps in the cable where the shunt tapes end.

This may be achieved by forming the cable during the same process as winding the cable around the former, e.g. by providing one or more spools of HTS tape, which are brought together to form a cable, which is then wound around the former in a continuous process. The HTS shunts and substituted metal layers may then be added between the HTS tapes as a part of this process.

Figure 9:
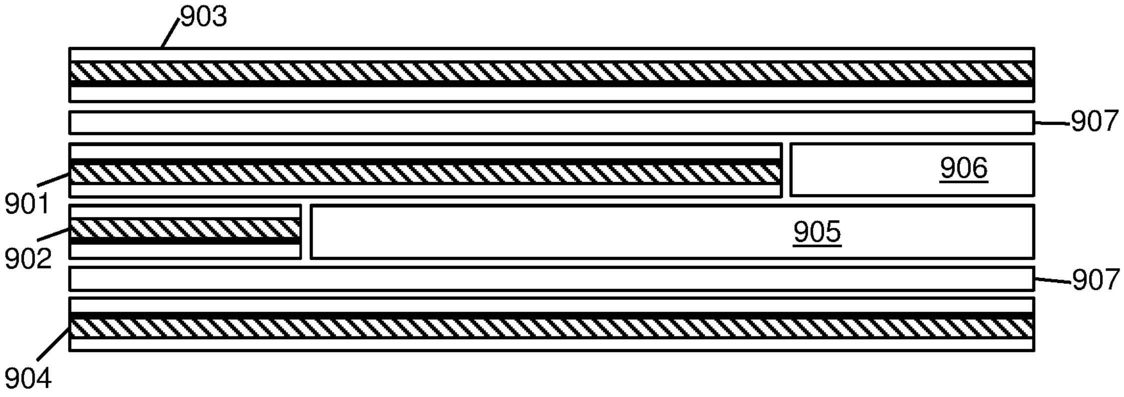
FIG. 9 is a schematic illustration of an alternative construction of an HTS coil.

FIG. 9 shows an alternative construction having the additional HTS tapes 901, 902 of the shunts between the turns 903, 904 of the HTS cable (only one tape of each turn shown). In FIG. 9, each HTS tape 901, 902 of the shunt terminates at a different point along the length of the HTS cable. This arrangement allows more control over the critical current of the cable as the magnetic field varies along its length The metal spacing elements 905, 906 extend to abut the respective tapes of the HTS shunt.

Additionally, FIG. 9 shows optional further metal tapes 907 which may be placed between the HTS shunt and the main HTS cable. These optional tapes may also be used in the construction of FIG. 8. They provide additional stability in the event of a local hot spot forming around a defect/dropout in one tape in the pair. The best quench performance (ie: slowest rise of hot spot temperature) will occur if these additional tapes are made of copper. However, alternative higher strength materials, such as a steel or nickel/tungsten alloy, may be preferred in high stress applications.

Figure 10:
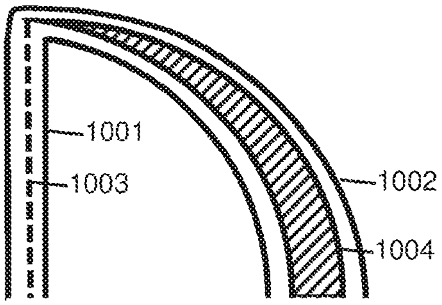
FIG. 10 is a schematic illustration of an HTS coil having additional spacing elements.

The core of a spherical tokamak requires high current density in the TF coils, to minimise the space taken by windings and maximise the space available for neutron shielding. This is less important in the return limbs, where conductors can be spread out to reduce the field seen by any conductor from its near neighbours. As illustrated schematically in FIG. 10, in the parts of the coil where high current density is not needed (e.g.: in the return limbs of a TF coil), the tapes 1001, 1002 in any part of a turn can be spread apart to reduce the field on any tape, e.g. by adding further spacing elements in selected regions, in the same manner as for other components disclosed above, or by increasing the width of the metal spacing elements 1004 in the selected regions. This reduces the total number of tapes needed, as it increases the critical current per tape in those regions. Similar principles may be applied to the construction of FIG. 8, by inserting spacing elements between the turns of the HTS cable within the regions where current density is not important.

Current transfer is easiest (i.e. the resistance is lower) where an HTS layer of the main coil cable faces an HTS layer of a shunt (i.e. the outer cables of the coil cable and shunt cable form a type-0 pair). As such, the HTS cables of the main coil cable and each shunt may be formed such that the outer HTS tapes of the cable have HTS layers facing outward from the cable.

Figure 11:
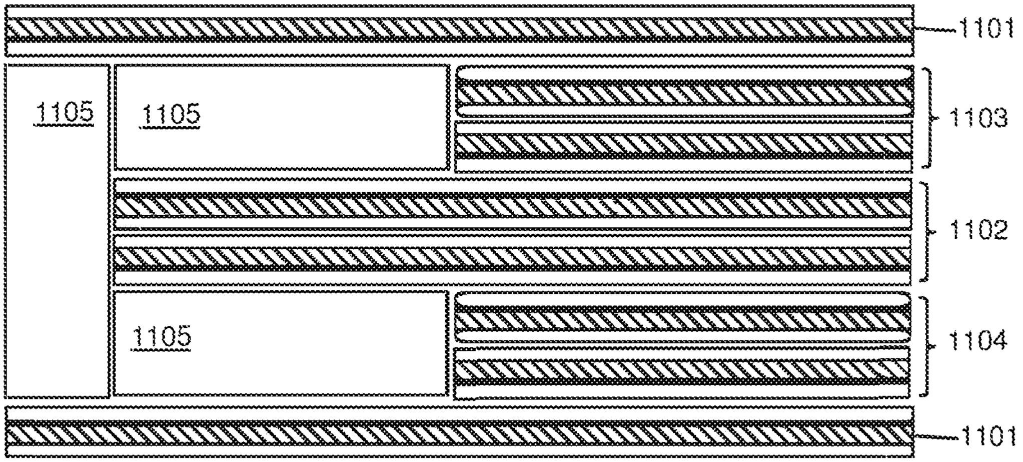
FIG. 11 is a schematic illustration of a section of an HTS coil having HTS shunts.

FIG. 11 shows an arrangement which achieves this. FIG. 11 shows a section of coil comprising a wound HTS coil 1101 and three HTS shunts 1102, 1103, 1104. Only the outer tapes of the wound HTS coil are shown, and this tape has the HTS layer facing outward. Each HTS shunt 1102-1104 is provided as a single type-2 pairs—i.e. two HTS tapes arranged such that the substrates are between the HTS layers. Where more than two additional HTS tapes are required between turns of the cable, multiple HTS shunts are provided. Spacing elements 1105 are provided to ensure an even coil cross section, as described above, though these are optional.

The coil may be wound as a double pancake coil—i.e. with two coils wound in opposite sense and connected at their inner terminals. The connection can be a resistive joint, but it is possible to avoid a joint completely by winding the pair from a single length of cable, as known in prior art. The arrangement of HTS shunts in the two coils may be the same (as they are exposed to substantially the same conditions), but the heaters, sensors, and other components inserted into the coil may vary.

What is claimed is:

1. A high temperature superconductor, HTS, coil comprising:

an HTS coil cable arranged to form a spiral having a plurality of turns, wherein the HTS coil cable includes at least one HTS shunt cable arranged between HTS tapes of the HTS coil cable along an arc of the HTS coil cable such that the HTS shunt cable and the HTS coil cable are electrically connected, wherein the HTS shunt cable includes HTS tapes which are arranged parallel to the HTS tapes of the HTS coil cable.

2. The HTS coil according to claim 1, wherein the HTS coil is configured to be a toroidal field coil and the first arc contains a central column of the toroidal field coil.

3. The HTS coil according to claim 1, wherein the HTS coil cable includes a plurality of HTS shunt cables, and where each HTS shunt cable lies along the arc of the HTS coil cable.

4. The HTS coil according to claim 3, wherein each turn of the HTS coil includes an HTS shunt cable of the plurality of HTS shunt cables.

5. The HTS coil according to claim 1, wherein each HTS shunt cable includes HTS tapes having a substrate and an HTS layer, and wherein the HTS shunt cable is interleaved such that an HTS layer of an HTS tape of the HTS shunt cable faces an HTS layer of an HTS tape of the HTS coil cable.

6. The HTS coil according to claim 1, wherein each HTS shunt cable includes HTS tapes, and each HTS tape ends at a different point along the HTS coil cable.

7. A method of manufacturing a high temperature superconducting, HTS, coil, the method comprising:

interleaving one or more HTS shunt cables between HTS tapes of an HTS coil cable, such that, when the one or more HTS coil cable is wound to produce a coil, HTS shunt cable lies along a first arc of the coil;

wherein the one or more HTS shunt cables includes HTS tapes, and the HTS tapes of the HTS shunt cables are arranged parallel to the HTS tapes of the HTS coil cable such that the HTS shunt cables are electrically connected to the HTS coil cable; and the method further including:

winding the HTS coil cable to produce a coil having a plurality of turns.

8. The method according to claim 7, and including repeating the step of interleaving an HTS shunt cable between HTS tapes of the HTS coil cable for each of a plurality of shunts, such that when the HTS coil cable is wound around the former, each HTS shunt cable lies along the first arc.

9. The method according to claim 8, and including interleaving HTS shunt cables such that when the HTS coil cable is wound around the former, there is an HTS shunt cable in each turn of the coil.

10. The method according to claim 7, wherein each HTS shunt cable includes HTS tapes having a substrate and an HTS layer, and wherein the HTS shunt cable is interleaved such that an HTS layer of an HTS tape of the HTS shunt cable faces an HTS layer of an HTS tape of the HTS coil cable.

11. The method according to claim 7, wherein each HTS shunt cable includes HTS tapes, and each HTS tape ends at a different point along the HTS coil cable.

* * * * *